Sept. 25, 1951 C. L. FAUDELL 2,568,914

ELECTRICAL INTEGRATING CIRCUITS

Filed Feb. 20, 1947

INVENTOR.
CHARLES L. FAUDELL
BY
H. S. Grover,
ATTORNEY

Patented Sept. 25, 1951

2,568,914

UNITED STATES PATENT OFFICE 2,568,914

ELECTRICAL INTEGRATING CIRCUITS

Charles Leslie Faudell, Wexham Street, near Stoke Poges, England, assignor to Electric & Musical Industries Limited, Hayes, Middlesex, England, a company of Great Britain Application February 20, 1947, Serial No. 729,682
In Great Britain February 23, 1946

11 Claims. (Cl. 250—36)

Figures 1, 2, 3, 4:
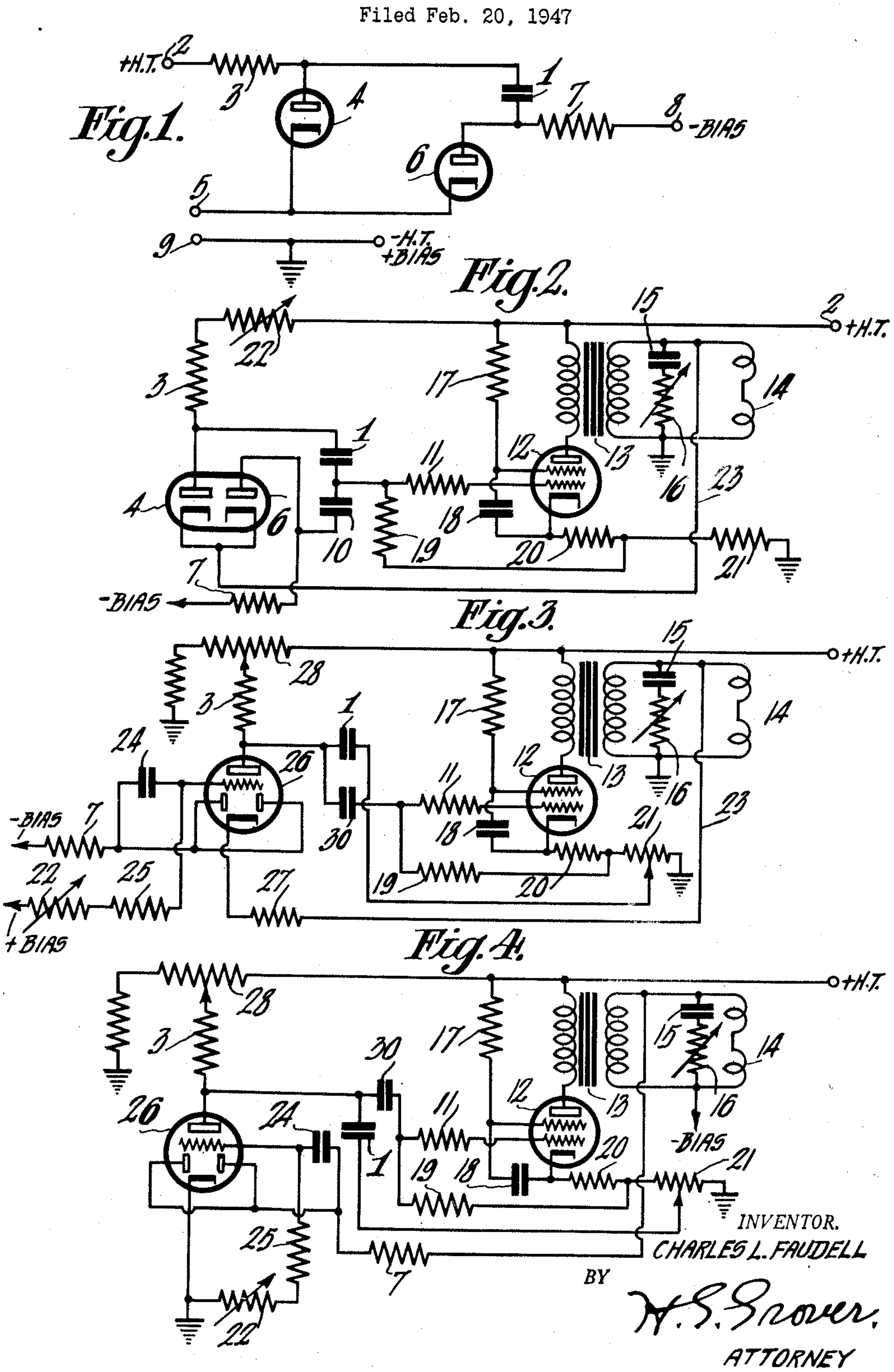

This invention relates to electrical integrating circuits of the kind comprising an electrical storage device, for example a condenser, which is adapted to be charged from a source of voltage and periodically discharged by a unilaterally-conducting device. Such circuits may be employed for the purpose of generating oscillations of sawtooth waveform suitable for use in television apparatus and the like. One such oscillation generator is described in the specification of British Patent No. 461,325. The generator described in this specification comprises a condenser which is charged from a source of constant voltage and a potential proportional to that developed across the condenser is applied to an amplifying valve which serves to set up in an output transformer a current of sawtooth waveform. The condenser is discharged periodically by the provision of a unilaterally-conducting device in the form of a diode, the cathode of the diode being coupled to the anode of the amplifying valve in such a way that a retroactive coupling is provided which serves to render the diode rapidly conducting to discharge the condenser to generate the short flank of the sawtooth waveform. When employing such an oscillation generator in a television receiver it is often necessary to adjust the amplitude or the waveform or the frequency of the oscillations generated, but it is found on such adjustment that the potential to which the condenser is discharged does not remain constant but varies with the changes in the circuit constants necessary to vary the amplitude, the waveform or the frequency of the generated oscillations.

The object of the present invention is to provide an improved integrating circuit of the kind described in which the storage device can be discharged to a substantially constant value despite changes which may be effected in the circuit constants to vary the amplitude, the waveform or the frequency of the generated oscillations.

According to the invention the storage device is associated with a further unilaterally-conducting device which is so arranged that when said storage device is discharged to a predetermined amount said unilaterally-conducting device functions to prevent further discharge of said storage device.

The invention is of particular use in sawtooth oscillation generators for television purposes, but is equally applicable to other oscillation generators, such as for example, pulse generators in which discharge of an integrating device is normally dependent on circuit constants which may require adjustment.

In order that the said invention may be clearly understood and readily carried into effect, it will now be more fully described with reference to the drawings, which illustrate the invention as applied, by way of example, to sawtooth oscillation generators and in which—

Figure 1 is a simplified circuit diagram illustrating the principle of the invention, Figure 2 illustrates a practical circuit diagram of a sawtooth oscillation generator suitable for use in a television receiver, and Figures 3 and 4 illustrate further examples of oscillation generators embodying the invention.

The integrating circuit shown in Figure 1 comprises a storage device in the form of a condenser 1, which is arranged to be charged periodically, from a source of substantially constant potential connected to the terminal 2, via a resistance 3. The condenser 1 is periodically discharged by the provision of a unilaterally-conducting device 4, shown as a diode, the anode of which is connected to the end of the resistance 3 which is connected to the condenser 1, whilst the cathode of the diode is connected to terminal 5. The term "discharged" employed herein includes cases in which the potential difference between the plates of the condenser not only is reduced to zero but can become reversed in sign. In accordance with the present invention a further unilaterally-conducting device 6 is provided, shown in the form of a diode, the anode of the diode 6 being connected to the electrode of the condenser 1 remote from the electrode of the condenser which is connected to the anode of the diode 4, whilst the cathode of the diode 6 is connected to the cathode of the diode 4. A resistance 7 serves as a load for the diode 6 and to maintain the anode of the diode 6 at a suitable negative potential, such negative potential being derived from a bias source connected to the terminal 8. In operation of the circuit shown in Figure 1 it is convenient to assume that the anode of the diode 4 is at a negative potential with respect to the cathode so that the diode 4 is non-conducting and the condenser 1 is slowly charged via the resistance 3 to generate the long flank of the sawtooth oscillation. The potential of the anode of the diode 4 likewise increases and at an appropriate point in the cycle the diode 4 is rendered conducting, as for example, by the application of a negative pulse to the terminal 5 and associated terminal 9, so that the condenser 1 is discharged through the diode so as to generate the short flank of the sawtooth oscillation. In the absence of the diode 6 the condenser 1 would be discharged to a value corresponding to the negative pulse applied to the terminals 5 and 9 and if the value of this negative pulse were varied, as for example, due to variations in the circuit constants of the circuit from which the pulse was derived, the amplitude of the sawtooth oscillations generated by the condenser 1 would likewise vary. The negative pulses applied to the terminals 5 and 9 may be derived in the manner described in the specification of British Patent No. 461,325 so that in such a case, on variation of the amplitude, or the waveform or the frequency of the generated oscillations the condenser 1 would not be discharged to a constant value but to a value dependent on the negative pulse applied to the terminals 5 and 9 which would vary as above-mentioned. The provision of the diode 6, however, serves to overcome these difficulties. The bias potential applied to the anode of the diode 6 is arranged to be somewhat less than the maximum negative potential applied to the terminals 5 and 9 so that at an appropriate point in the discharge cycle of the condenser 1 the diode 6 commences to conduct at a time dependent on the negative potential applied to its anode and from thenceforth during the remainder of the discharge cycle the anode potential of the diode 6 substantially follows the anode potential of the diode 4 and so prevents discharge of the condenser 1 to a value different from that determined by said negative bias. In this manner it can be ensured that the potential to which the condenser 1 is discharged remains substantially constant and independent of the negative potential applied to the terminals 5 and 9. The impedance of the diode 6 when conducting should be appreciably less than the impedance of resistance 7 and preferably the impedance of the diodes 4 and 6 are equal and to ensure such condition it may be advantageous to employ a resistance which is common to both cathodes of the diodes.

A practical embodiment of the invention is shown in Figure 2 of the drawings which illustrates a circuit similar to that described in the specification of British No. 461,325. As shown in this figure, the diodes 4 and 6 are combined in a single envelope and the condenser 1 is arranged in series with a further condenser 10 forming a capacitative potentiometer as referred to in the aforesaid patent specification. The junction point of the condensers 1 and 10 is connected via a coupling resistance 11 to the control electrode of a tetrode amplifying valve 12, the anode of which is connected to the primary winding of a transformer 13, the secondary winding of which serves to generate in scanning coils indicated at 14, currents of sawtooth waveform. Shunted across the coils 14 is a series combination of a condenser 15 and variable resistance 16, variation of the resistance 16 serving to adjust the waveform of the generated oscillations. The screening electrode of the valve 12 is connected via a resistance 17 to the source of anode potential for the valve 12 which is connected to the terminal 2, the screening electrode being decoupled to the cathode of the valve 12 via a condenser 18. The junction point of the condensers 1 and 10 is connected via a leak resistance 19 to the junction point of a resistance 20 and a variable resistance 21 arranged in the cathode circuit of the valve 12, variation of the resistance 21 serving to adjust the amplitude of the generated oscillations. The anode of the diode 4 is connected to the terminal 2 via a resistance 3 and a variable resistance 22 adjustment of resistance 22 serving to control the frequency of the generated oscillations. The anode of the diode 6 is connected to the condenser 10, as shown, and is also connected via the resistance 7 to a source of negative bias. The cathodes of the diodes 4 and 6 are connected together and are connected to the output circuit of the valve 12 by lead 23, as shown. The operation of the circuit shown in Figure 2 is similar to that described in the specification of the aforesaid patent, the condensers 1 and 10 being slowly charged to generate the long flank of the sawtooth oscillation when the diodes 4 and 6 are nonconducting and at an appropriate point in the charging cycle the diode 4 is rendered rapidly conducting to generate the short flank of the oscillation due to the coupling between the cathode of the diode 4 and the output circuit of the valve 12 and when the condensers 1 and 10 are discharged to a predetermined potential the diode 6 is rendered conducting so as to prevent further discharge of said condensers. Since the point at which the diode 6 is rendered conducting is determined by the bias potential applied to its anode, the condensers 1 and 10 can be arranged to be discharged to a constant potential despite adjustment of the resistance 16, 21 or 22.

An alternative circuit embodying the invention is shown in Figure 3 which is generally similar to that described in connection with Figure 2 and like elements in both figures are given similar reference numerals. In Figure 3 the frequency of the generated oscillations is controlled by the provision of a condenser 24 and the resistance 22 arranged in series with a further resistance 25 and associated with the control electrode of a double-diode triode valve 26 which replaced the diode 4. The potentiometer formed by the condensers 1 and 10 is omitted and the anode of valve 26 is isolated from the control electrode of valve 12, in so far as D. C. is concerned by a blocking condenser 30. It will be seen from Figure 3 that the two anodes of the diodes of the valve 26 are connected together so that, in fact, only one diode need be employed in the circuit. This diode serves to replace the diode 6. The anodes of the diodes of valve 26 are connected to the source of negative bias via the resistance 7 whilst the common cathode of the diodes and triode of the valve 26 is connected via the lead 23 and resistance 27 to the output circuit of the valve 12. The triode section of the valve 26 replaces the diode 4 of Figures 1 and 2 in generating the short flank of the sawtooth, the control electrode of the triode being maintained at a positive potential relative to the cathode and when the triode of the valve 26 is rendered conducting when the cathode of the valve is driven negative from the output circuit of the valve 12, the control electrode of the triode section of the valve 26 takes current and charges the condenser 24 to a negative potential until the diode section is rendered conducting so preventing further charging of the condenser 24. When the triode of the valve 26 is rendered conducting the condenser 1 is discharged until the diode section of the valve 26 is rendered conducting. If desired, the condenser 24 and resistances 22 and 25 which control the frequency of the generated oscillations can be arranged in the cathode circuit of the valve 26 so freeing the control electrode of said valve for the application of synchronising signals. A modified form of amplitude control for the generated oscillations is shown in Figure 3 from which it will be observed that the condenser 1 is connected to a variable tapping point on the resistance 21. Instead of employing such a form of amplitude control, amplitude control can also be effected by connecting the upper end of the resistance 3 in the anode of the valve 26 to a potentiometer 28.

Figure 4 of the drawings illustrates a circuit somewhat similar to that shown in Figure 3 which differs mainly from the circuit shown in Figure 3 in that the condenser 24 is connected via the resistance 7 to the output circuit of the valve 12 via the lead 23 and the negative bias for the anodes of the diode sections of the valve 26 is applied to the output circuit of the valve 12 via lead 29.

The present invention is, as mentioned above, particularly suitable for use for the generation of oscillations for use in television apparatus and can be applied both to circuits for generating oscillations at line frequency and also at frame frequency. Furthermore, the invention is also applicable to oscillators for the generation of oscillations of other waveforms and in general it can be applied to any integrating circuit where it is required to discharge a storage device always to a constant value.

What I claim is:

1. In an electrical circuit, the combination of a storage device having at least two terminals, a first and second unilaterally conductive discharge path, each having associated therewith an anode and a cathode, connections placing each discharge path in series conductive opposition with one another to form a combination, means connecting said combination in shunt with said storage device, means for storing energy in said storage device, and means for applying conduction control signals to the anode-cathode circuits of said first and second discharge paths.

2. An electrical circuit, the combination of a storage device having at least two terminals, a first and second unilaterally conductive discharge paths serially connected in conduction opposition, each path having associated therewith an anode, and a cathode, a connection from the first discharge path anode to one terminal of the storage device, a connection from the second discharge path anode to the other terminal of said storage device, means for storing energy in said storage device, means for completing a direct current circuit between the anode and cathode of each discharge path, and means for applying conduction control signals to the anode-cathode circuits of said first and second discharge paths.

3. Apparatus according to claim 2 wherein said means for storing energy in said storage device comprises a first impedance connected from one terminal of said energy storage device to a source of positive supply voltage, and a second impedance connected from the other terminal of said storage device and a source of relatively negative supply potential.

4. Apparatus according to claim 3 wherein said means for applying conduction control signals in the anode-cathode circuits of said first and second discharge paths is connected between the cathode of the first discharge path and said source of relatively negative supply potential.

5. Apparatus according to claim 4 wherein said unilaterally conductive discharge path each comprises a diode and wherein said storage device comprises a capacitor.

6. In an electrical circuit having a source of positive supply potential, a source of negative supply potential and a reference potential intermediate between the positive and negative potential, in combination, an electrical storage device having opposite terminals thereon respectively connected with the source of positive and negative supply potentials through electrical circuit impedances, a first and second unilaterally conductive discharge path device, each path device having an anode and a cathode, the cathodes of said discharge paths being connected with one another, a connection from the positive terminal of said storage device to the first discharge path anode, a connection from the negative terminal of said storage device to the second discharge path device anode, means for biasing said discharge path devices relative to said point of reference potential such that they are nominally non-conductive under conditions of minimum charge on said storage device, and connections for applying negatively extending conduction control pulses between the cathodes of said discharge paths and said point of reference potential.

7. Apparatus according to claim 6 wherein said first and second discharge paths respectively comprise a diode.

8. Apparatus according to claim 6 wherein said first and second unilaterally conductive paths reside in a two-section electron discharge tube having at least an anode and control electrode and cathode defining a first tube section, and at least an anode and cathode defining a second tube section wherein said first unilaterally conductive discharge path is established between the control electrode and cathode of said first tube section and said second unilaterally conductive discharge path is established between the anode and cathode of said second tube section.

9. In a sawtooth generating circuit, a source of charging potential having a positive and negative terminal, a capacitor having a first and second terminal, an impedance connected from the positive power supply terminal to the first terminal of said capacitor, an impedance connected from the negative power supply terminal to the second terminal of said capacitor, a first and second unilaterally conductive discharge path device, each having an anode related to a cathode, connections placing said discharge path devices in conductive opposition with one another to form a series combination in shunt with said capacitor, means for biasing said discharge paths into nonconduction for low values of charge on said capacitor, a source of conduction control signal for said discharge path devices, and connections for concomitantly applying said conduction control signals to the first and second unilaterally conductive discharge paths.

10. Apparatus according to claim 9 wherein a version of the developed sawtooth across said capacitor is applied as a deflection drive signal of a cathode ray tube electromagnetic deflection yoke and wherein said source of conduction control signal comprises a connection which samples the voltage developed across said deflection yoke.

11. In an electrical circuit, the combination of a storage device having at least two terminals, a first and second unilaterally conductive discharge paths, connections placing said discharge paths in series conductive opposition with one another to form a combination having two extremities, connections placing said storage device across the extremities of said combination, a first, second and third power supply terminals, said first and second terminals having opposite polarity relative to said third terminal, separate impedances respectively connected from opposite terminals of said storage device to said first and second power supply terminals, means providing a circuit path from the point of connection of said discharge paths with one another to said third power supply terminal and means for periodically controlling the conduction of said discharge paths in accordance with a timing control signal.

CHARLES LESLIE FAUDELL.

REFERENCES CITED

The following references are of record in the file of this patent:

UNITED STATES PATENTS

| Number | Name | Date |
|---|---|---|
| 2,258,752 | Fewings et al. | Oct. 14, 1941 |
| 2,265,290 | Knick | Dec. 9, 1941 |
| 2,363,810 | Schrader et al. | Nov. 28, 1944 |
| 2,414,486 | Rieke | Jan. 21, 1947 |
| 2,458,599 | Hussey | Jan. 11, 1949 |